United States Patent
Cugnini et al.

(10) Patent No.: US 8,238,886 B2
(45) Date of Patent: Aug. 7, 2012

(54) SYSTEM AND METHOD FOR PROVIDING INTERACTIVE SERVICES USING A MOBILE DEVICE

(76) Inventors: Aldo G. Cugnini, Long Valley, NJ (US); Carlo Basile, Hopewell, NJ (US); Louis H. Libin, Woodmere, NJ (US)

( * ) Notice: Subject to any disclaimer, the term of this patent is extended or adjusted under 35 U.S.C. 154(b) by 89 days.

(21) Appl. No.: 12/833,759

(22) Filed: Jul. 9, 2010

(65) Prior Publication Data

US 2011/0014899 A1    Jan. 20, 2011

Related U.S. Application Data

(60) Provisional application No. 61/271,117, filed on Jul. 17, 2009.

(51) Int. Cl.
*H04W 4/00* (2009.01)
(52) U.S. Cl. .................. 455/414.1; 725/62
(58) Field of Classification Search ............ 725/13, 725/42–46, 62, 132–135
See application file for complete search history.

(56) References Cited

U.S. PATENT DOCUMENTS

| | | | |
|---|---|---|---|
| 5,539,810 A | 7/1996 | Kennedy, III et al. | |
| 5,826,195 A | 10/1998 | Westerlage et al. | |
| 6,018,657 A | 1/2000 | Kennedy, III et al. | |
| 6,108,537 A * | 8/2000 | Comer et al. ............. | 455/426.1 |
| 7,493,078 B2 | 2/2009 | Perlman | |
| 7,904,924 B1 * | 3/2011 | de Heer et al. ............ | 725/46 |
| 2005/0055729 A1 | 3/2005 | Atad et al. | |
| 2005/0068915 A1 | 3/2005 | Atad et al. | |
| 2005/0114891 A1 * | 5/2005 | Wasenius ............... | 725/62 |
| 2005/0251823 A1 * | 11/2005 | Saarikivi ............... | 725/42 |
| 2006/0130099 A1 * | 6/2006 | Rooyen ................. | 725/62 |
| 2007/0061844 A1 * | 3/2007 | Hakusui et al. ........... | 725/62 |
| 2007/0067808 A1 * | 3/2007 | DaCosta ............... | 725/62 |
| 2007/0207813 A1 | 9/2007 | Fourquin et al. | |
| 2007/0261081 A1 | 11/2007 | Nilsson et al. | |
| 2008/0167031 A1 | 7/2008 | Sorber et al. | |
| 2008/0250441 A1 * | 10/2008 | Sharma et al. ........... | 725/13 |
| 2011/0113463 A1 * | 5/2011 | Wong ................. | 725/132 |

OTHER PUBLICATIONS

Digital TV Brochure, ASTRA and SIRIUS: Europe's leading DTH and digital TV platform, Version 5—2 MByte, Reference nr.: ASTRA 0301-0908 EN, May 5, 2010, http://www.ses-astra.com/business/en/support/document-library/products-services/media/index.php.

Mike Hartl, Christian Rauch, Claus Sattler, Alfred Baier, Trial of a Hybrid DVB-H / GSM Mobile Broadcast System, 14th IST Mobile & Wireless Communications Summit, Dresden Jun. 19-23, 2005, Session: Broadcast Systems & Convergence: Monday, Jun. 20, 2005, 16:00-17:30, http://www.eurasip.org/Proceedings/Ext/ IST05/papers/521.pdf.

Digital Video Broadcasting (DVB); Interactive channel through the General Packet Radio System (GPRS), DVB Document A073, rev. 1, Jul. 2004.

(Continued)

*Primary Examiner* — Kamran Afshar
*Assistant Examiner* — Kashif Siddiqui
(74) *Attorney, Agent, or Firm* — David Alan Bryan

(57) ABSTRACT

A method of providing interactive services to a mobile device, comprising transmitting programming on-air to a first mobile device by a first facility in communication with a service provider and receiving by a second facility in communication with the service provider information based on the programming, wherein the first information comprises information relayed from the first device to the second facility after being processed by a second mobile device, is provided.

9 Claims, 12 Drawing Sheets

OTHER PUBLICATIONS

Sanaz Fallahkhair, Media convergence: An architecture for iTV and mobile phone based interactive language learning, EuroiTV 2004, Mar. 31-Apr. 2, 2004.

Khairul Hazim, Lotje, Quuxplusone, Satbuff, 2 anonymous edits, ASTRA Platform Services Source: http://en.wikipedia.org/w/index.php?oldid=355685774, Apr. 13, 2010.

* cited by examiner

SYSTEM AND METHOD FOR PROVIDING INTERACTIVE SERVICES USING A MOBILE DEVICE

CROSS REFERENCE TO RELATED APPLICATION

This application claims the benefit of U.S. Provisional Patent Application No. 61/271,117, filed Jul. 17, 2009, and entitled System and Method for Providing Interactive Services Using a Mobile Video Device, the entire disclosure of which is incorporated herein by reference.

BACKGROUND OF THE INVENTION

Mobile multimedia devices are currently constrained to either one-way operation, or two-way interactivity, for example on an integrated mobile telephone device. The former devices do not have interactivity, and the latter are closely tied to a mobile telephone service provider. In one embodiment, the current invention enables a mobile multimedia device to use any wireless service for interactivity, and also frees the mobile device from needing an integrated wireless transmitter and/or receiver.

SUMMARY OF THE INVENTION

In a first aspect, a method of providing interactive services to a mobile device, comprising transmitting programming on-air to a first mobile device by a first facility in communication with a service provider and receiving by a second facility in communication with the service provider information based on the programming, wherein the first information comprises information relayed from the first device to the second facility after being processed by a second mobile device, is provided.

In a second aspect, a system for providing interactive services to a mobile device, comprising means for transmitting programming on-air to a first mobile device by a first facility in communication with a service provider and means for receiving by a second facility in communication with the service provider first information from a first mobile device using a first wireless connection, and wherein the first information is information generated by the first device based on second information received from a second mobile device connected to the first device by a second wireless connection, is provided.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
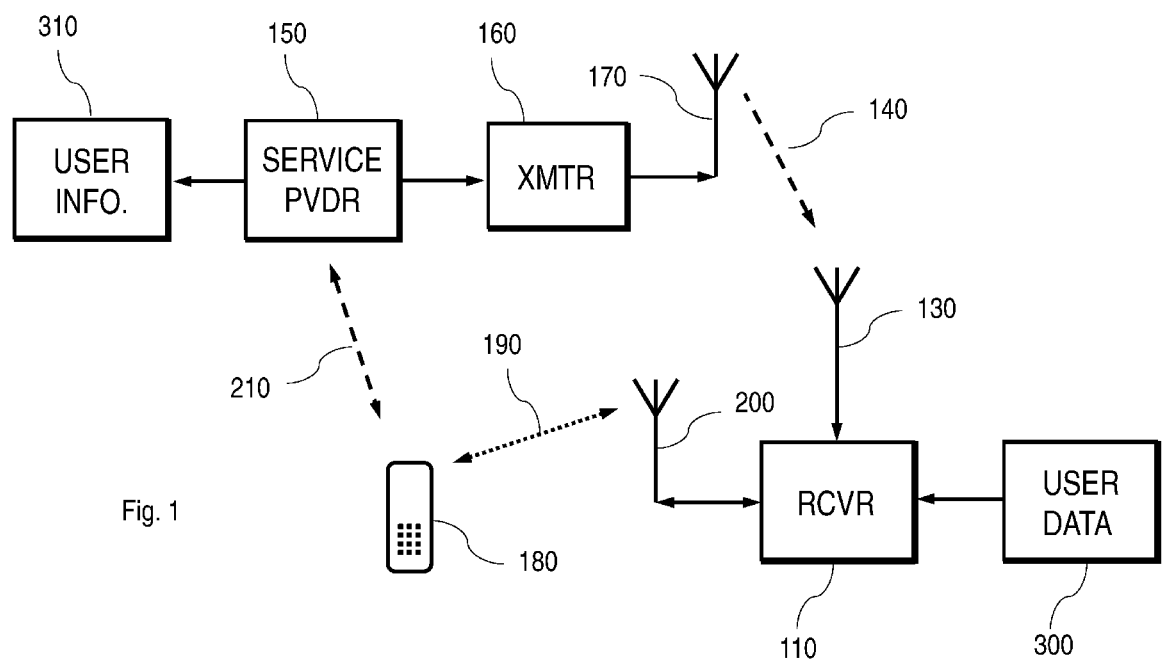
FIG. 1 shows a basic block diagram of one overall embodiment.

Certain terminology is used herein for convenience only and is not to be taken as a limitation on the embodiments of the present invention. In the drawings, the same reference letters are employed for designating the same elements throughout the several figures.

One embodiment of the basic building blocks of the invention is illustrated in FIG. 1. The embodiment of FIG. 1 may utilize, but is not limited to utilizing, the following technologies: digital video mobile transmission and reception, cellular telephone data communication, short-distance wireless data communication and Bluetooth data communications.

Digital mobile video transmission may include over-the-air transmission according to any of a variety of standardized transmission protocols, such as ATSC, ATSC Mobile, DVB-T, DVB-H, ISDB-T, 1-Seg, DMB-T, and MBMS, among others, as well as proprietary services such as Sirius satellite video, MediaFlo, "wireless cable" and the like. In general any transmission system capable of supporting over-the-air real time transmission of multimedia information may be used.

Cellular telephone data communications may include protocols from the IS-136 family, CDMA family, and GSM family, including variants of GPRS, so-called "3G" and "4G" standards, UMTS, HSDA, HSPDA, and LTE, among others. In general any transmission system capable of supporting wireless transmission of digital information at a sufficiently high rate may be used.

Short-distance wireless data communication may include protocols such as IEEE 802.x, Zigbee, Ultra-wideband (UWB), and Bluetooth. Short-distance wireless data communication may also include optical methods such as an Infrared communications link. In general any transmission system capable of supporting short-range wireless transmission of information at a sufficiently high rate may be used.

Bluetooth is a well known standard for short-range digital communications that includes variants capable of supporting real-time transmission of audio-visual information. For example Bluetooth headsets for cellular phones are widely available.

Referring again to FIG. 1, a user-operated receiver (110) provides entertainment, such as audio-visual programming and the like, to a user. The user-operated receiver uses an antenna (130) to receive programs by means of an over-the-air transmission (140) that is sent by a service provider (150) using an over-the-air transmission facility comprising a transmitter (160) and transmitting antenna (170). This over-the-air transmission is inherently uni-directional, so, in some embodiments, interactive return information in the form of user data (300) may be provided to the service provider (150) as user information (310) by means of a wireless device (180), for example, a user-maintained cellular telephone that may be used to relay the user data between the user-operated receiver and the service provider.

Interactive return information may include, for example, time-sensitive information such as responses to polls and/or games presented to a viewer using a display associated with receiver (110), as well as less time sensitive information such as requests for further information about a product and/or user demographic information. In general interactive return information may include any information supplied by the user as user data (300).

In some embodiments, user-operated receiver (110) may use a bi-directional short-range wireless connection (190) to communicate with wireless mobile device (180) by means of a short-range antenna (200). In some embodiments, bi-directional connection (190) may comprise two uni-directional connections, i.e., one connection from receiver (110) to wireless device (180) and one connection from wireless device (180) to receiver (110).

In some embodiments, the user data (300) includes a history of the user's audio-visual program viewing, and other user preferences. The user data (300) may then be relayed to the service provider by means of a bi-directional wireless connection (210), for example the cellular telephone network. The complete return data path communication may be automated, so that no direct user input is required.

In some embodiments, the service provider may send data to the user-operated receiver over wireless connection (210) and short-range wireless connection (190). This data may include applications that may execute on the user-operated receiver, including user-interface applications and the like.

In some embodiments, as illustrated by the preceding examples, wireless connection (210) and short-range wireless connection (190) need not be bi-directional, For example if there is no requirement to transmit data from the service provider to the receiver (110), then short-range wireless connection (190) may be uni-directional from receiver (200) to device (180), and uni-directional from device (180) to service provider (150). Likewise at any given instant, and even for extended periods of time, in some embodiments there may be no need to transmit any user data (300), and in such embodiments wireless connection (210) need only be uni-directional from service provider (150) to wireless device (180), and short-range wireless connection (190) need only be uni-directional from wireless device (180) to receiver (200) the vast majority of the time.

Figure 2:
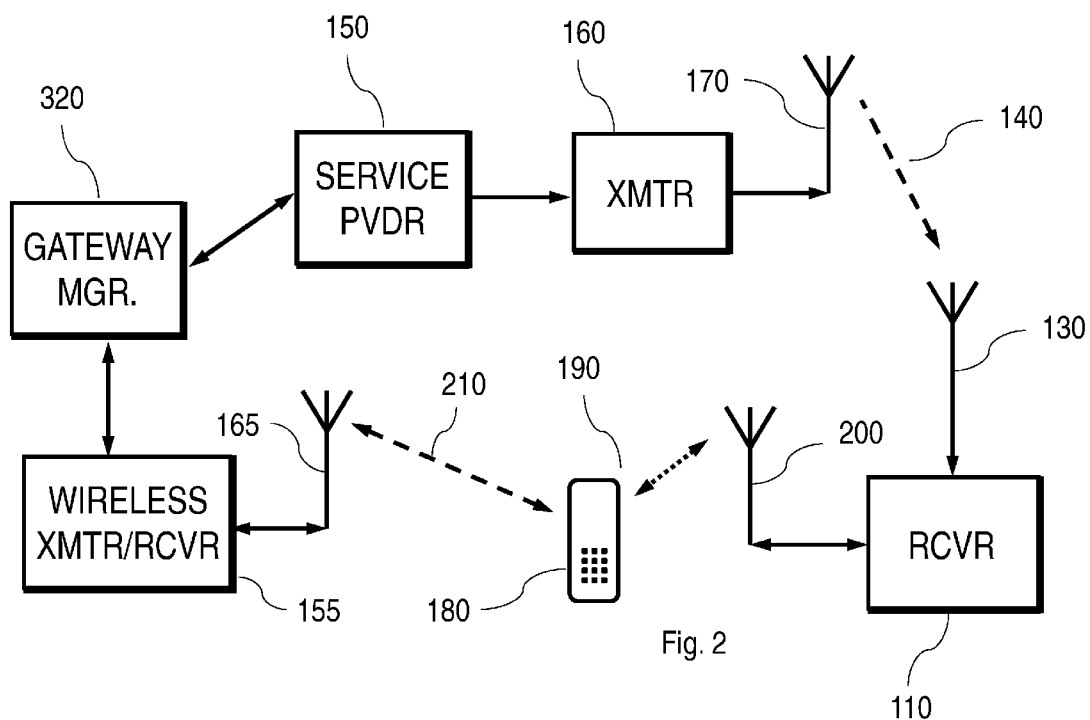
FIG. 2 shows a basic block diagram of one overall embodiment comprising a gateway manager.

Referring now to FIG. 2, in some embodiments, a gateway manager (320) may interface with service provider (150) and a wireless transmission/reception facility comprising a wireless transmitter/receiver (155). Wireless transmitter/receiver (155) uses an antenna (165) to receive and/or transmit information by means of wireless connection (210). For example, in some embodiments wireless transmitter/receiver (155) may comprise part of a transmission/reception facility of a cellular telephone service provider. In general wireless transmitter/receiver (155) may comprise part of any transmission/reception facility capable of communicating with wireless device (180) at a data rate sufficient to support wireless connection (210) without loss of data. For example in some embodiments wireless device (180) may comprise a multi-mode cell phone comprising an IEEE 802.11 wireless interface, and wireless transmitter/receiver (155) may support IEEE 802.11 communications with wireless device (180).

Figure 3:
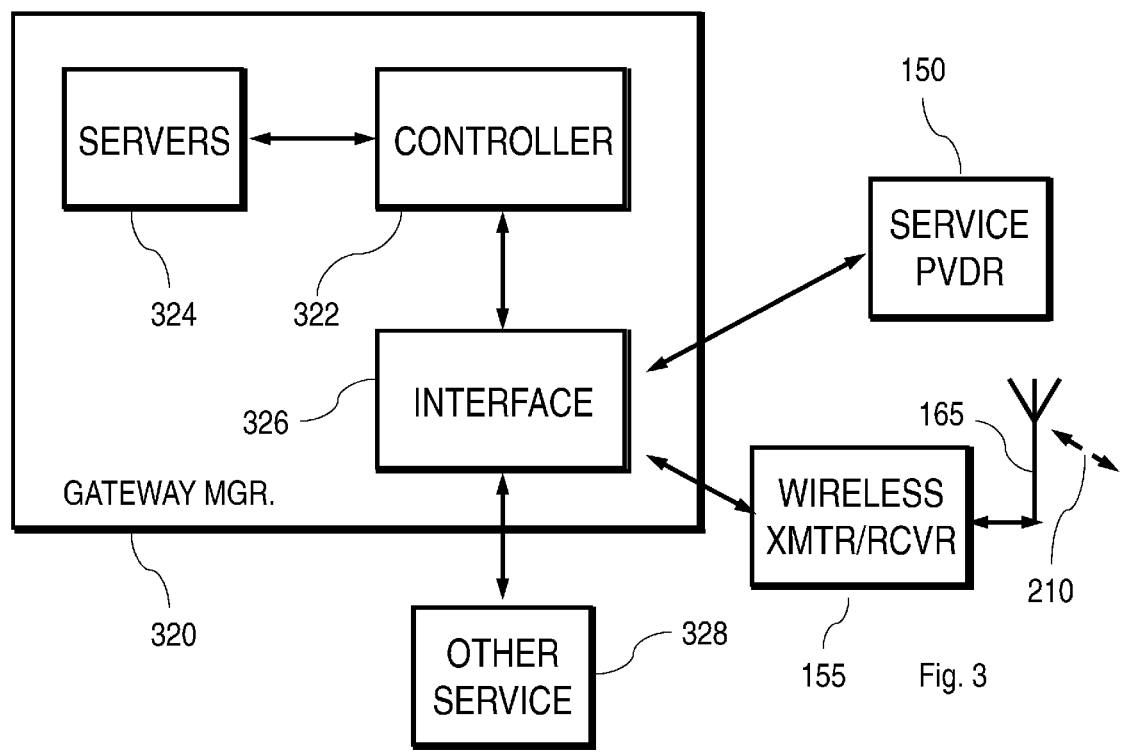
FIG. 3 shows a functional diagram of one embodiment of a gateway manager.

Referring now to FIG. 3, in some embodiments, gateway manager (320) may comprise one or more servers for storing, as examples, application programs and/or audio-visual programming to be relayed by wireless device (180) from wireless transmitter/receiver (155) to receiver (200), and/or user data relayed by wireless device (180) from receiver (200) to wireless transmitter/receiver (155). Controller (322) may manage the operations of servers (324) and interface (326). Interface (326) may provide data routing and/or protocol conversion functions to allow data to be exchanged among service provider (150), servers (324) and the wireless transmitter/receiver (155). Interface (326) may also comprise interfaces to one or more other content/service providers (328) besides service provider (150).

In some embodiments, in order to protect the privacy of the users and to provide a level of anonymity, the service provider may utilize the services of gateway manager (320) that may comprise a firewall to prevent the identity of users from being relayed directly to the service provider.

Figure 4:
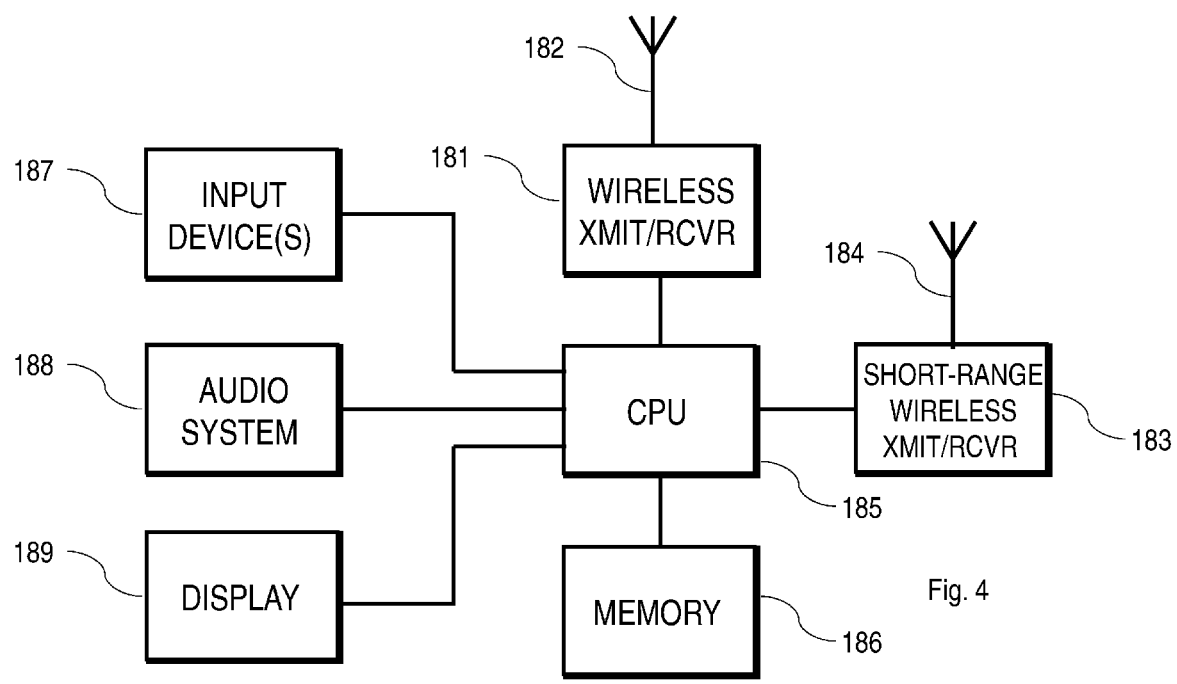
FIG. 4 shows one embodiment of a wireless mobile device.

Referring now to FIG. 4, in some embodiments a wireless mobile device (180) may comprise a wireless transmitter/receiver (182) that may communicate with service provider (150) using antenna (182). Wireless mobile device (180) may also comprise a short-range wireless transmitter/receiver (183) that may communicate with receiver (110). Short-range wireless transmitter/receiver (183) may, in some embodiments, comprise a Bluetooth transmitter and/or Bluetooth receiver. Wireless mobile device (180) may further comprise one or more input devices (187), for example, a keyboard, touch screen, one or more pointing devices, and/or a speech recognition function. Wireless device (180) may further comprise a display (189) capable of displaying video and/or graphics, and/or an audio system (188), for example a speaker and/or headphones. Wireless device (180) may further comprise memory (186), which memory may further comprise solid-state memory and/or hard disk memory suitable for storing application programs and data. For example memory (186) may comprise a hard drive suitable for storing large amounts of audio/visual programming. Software and/or firmware executed by CPU (185) may manage the various functions (181), (183), (186), (187), (188), (189) as well other functions that may comprise wireless device (180).

Figure 5:
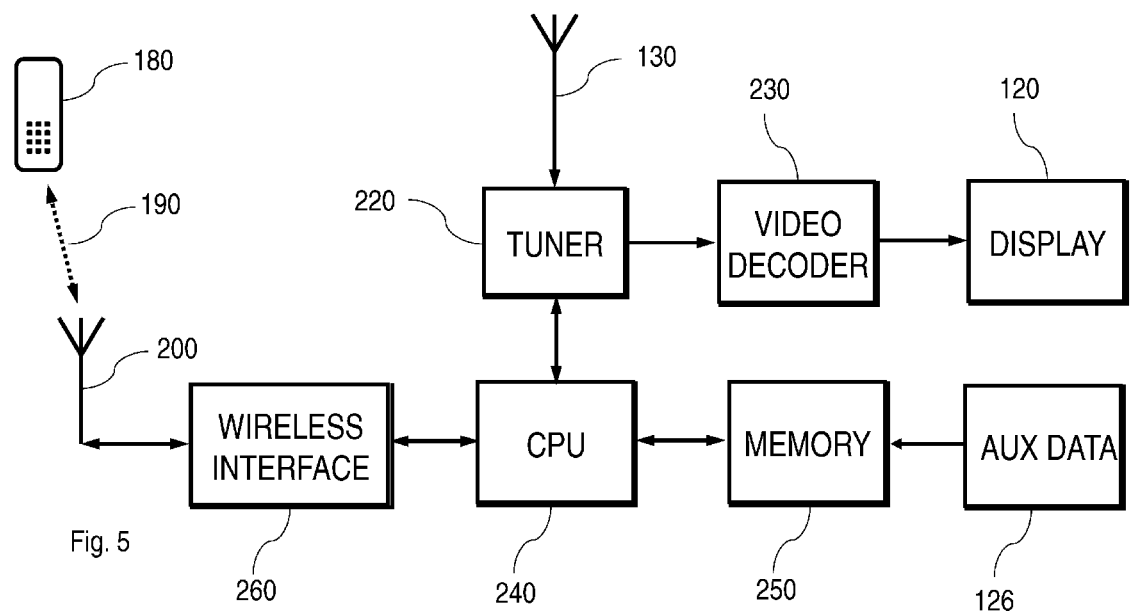
FIG. 5 shows one embodiment of a user-operated multimedia receiver.

The user-operated receiver may typically contain a tuner (220), as shown in FIG. 5, with which to select over-the-air broadcasts, and a video decoder (230) and video display (120) with which to reproduce the program content. The user-operated receiver may maintain information in a non-volatile memory (250). This information may include user-supplied input and/or service-provider-supplied data. User supplied input may be input using, for example a keyboard, touch-sensitive screen, or voice input device (not shown in FIG. 5) associated with receiver (110) and managed by CPU (240). CPU (240) may process user supplied input before storing it in memory (250). For example, CPU (240) may run speech-recognition software to convert digitized speech from a voice input device representing a user program selection to a digital data representation of the program selection before storing the digital data representation in a database of program selections stored in memory (250). The information about program selections may be used, in some embodiments, to provide personalized functionality to the user-operated receiver. CPU (240) may handle the data transactions to and from memory (250), and/or send data to wireless device (180) by means of the wireless interface (260).

Figure 6:
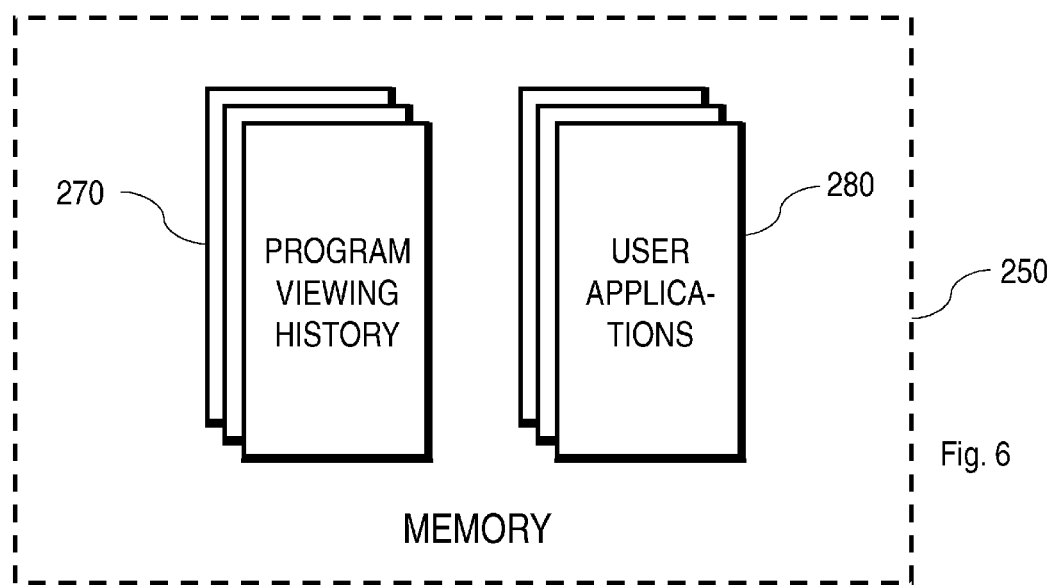
FIG. 6 shows an embodiment of non-volatile memory for storing application programs and/or the program viewing history of one or more users.
Figure 7:
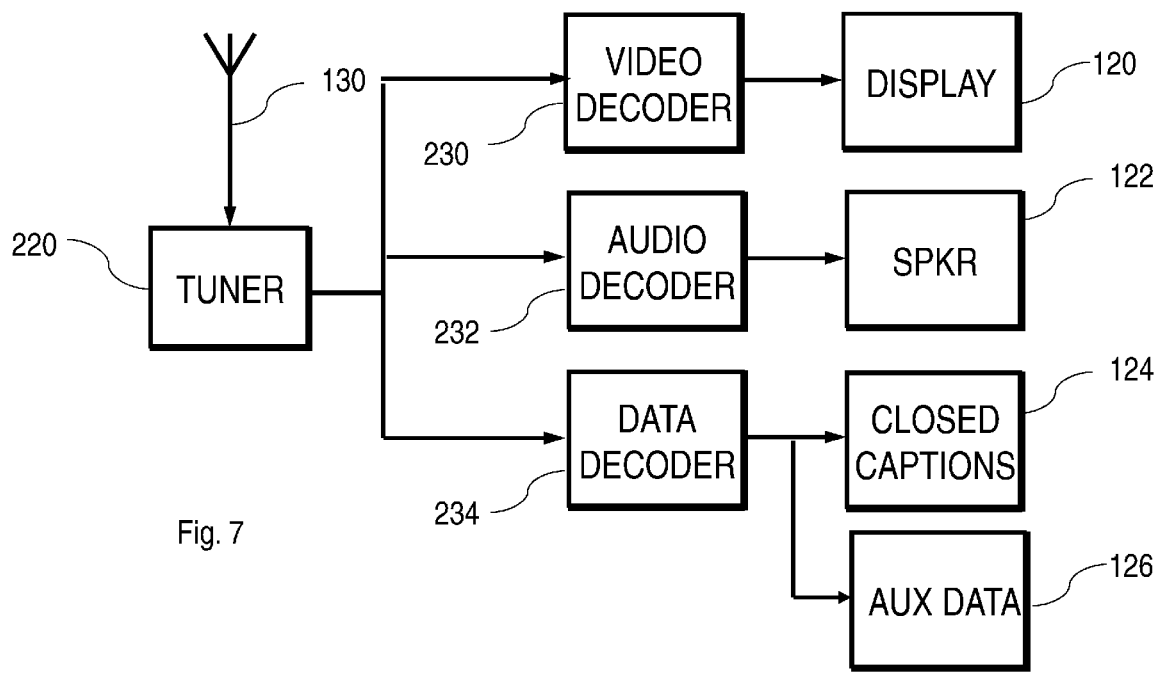
FIG. 7 shows another embodiment of a user-operated multimedia receiver.

The user-operated receiver (110) non-volatile memory may contain various types of user specific information, as shown in FIG. 6, such as a history of the user's program viewing (270), as well as multiple user applications (280). User applications (280) may be pre-stored in receiver (110) at the factory where receiver (110) is manufactured. User applications may also be downloaded and stored into memory (250) using the wireless interface (260) and/or, as shown in FIG. 7, as auxiliary data (126) output by a data decoder (234), that decodes data received using tuner (220). For example, the signal received by tuner (220) may comprise an MPEG transport stream containing not only audio-visual data, but also data representing user application programs. The output of tuner (220) may be demultiplexed into video data, audio data, and auxiliary data. Demultiplexed video data may be decoded by video decoder (230) and sent to display (120) Audio data may be decoded by audio decoder (232) and sent to speaker (122) or headphones. Auxiliary data (126) which may in some embodiments comprise application programs, may be sent to memory (250), as shown in FIG. 5, for storage as applications data (280). Demultiplexed auxiliary data may be stored directly into memory (250) by a Direct Memory Access (DMA) controller function (not shown in FIG. 5), the design of which is well known to those of normal skill in the digital design arts. Alternatively, auxiliary data may be sent to CPU (240) and CPU (240) may then store the auxiliary data in memory (250).

Figure 8:
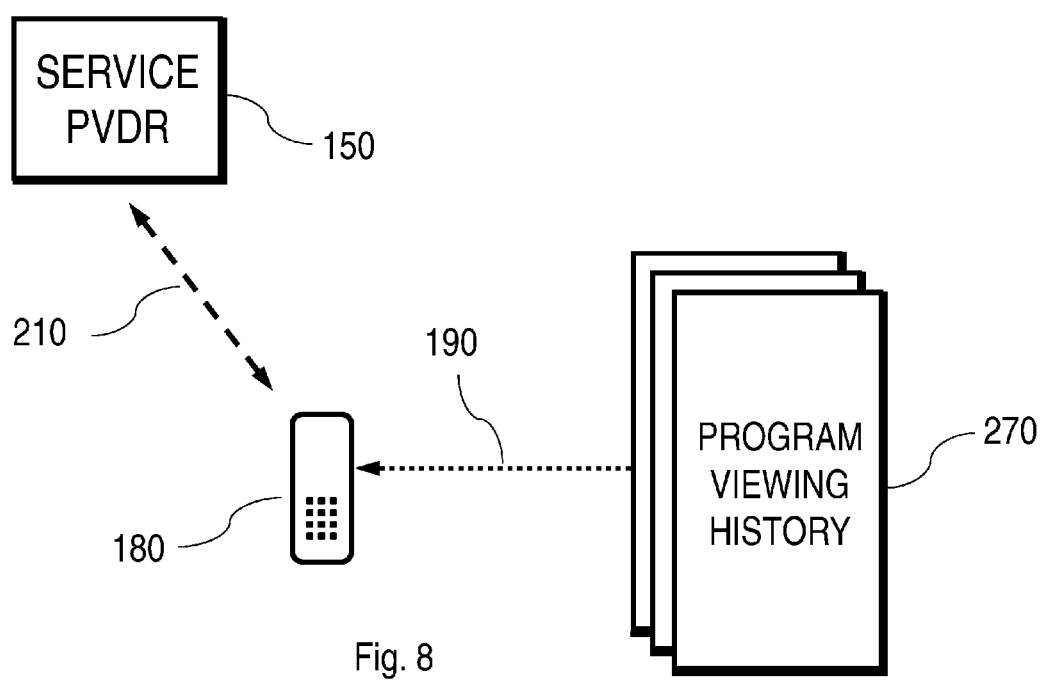
FIG. 8 shows an embodiment of transmitting program viewing history to a service provider using a wireless device as a relay.

Program viewing history may be sent to the service provider, as shown in FIG. 8, for example, so that the service provider can aggregate statistical information on program viewing behavior of multiple users. For example a representation of the program viewing history (270) may be retrieved from memory (250) by CPU (240) and sent to service provider (150) using wireless interface (260). Program viewing information may be gathered automatically, or upon explicit request.

Program viewing history (270) may be explicitly sent to service provider (150) following a request from service provider (150) relayed to receiver (110) by device (180). Upon receiving the request, CPU (240) may then retrieve the program viewing history (270) data from memory (250) and send it to service provider (150) using wireless interface (260).

For example, program viewing information may be automatically (without explicit request from service provider (150) or user intervention) sent to service provider (150) during or after each program is viewed at receiver (110), in which case program viewing history (270) may be stored only briefly, or not at all, in memory (250), or alternatively, after some number of programs are viewed.

Buffering of some number of program viewing indications before sending to the service provider may be done by the receiver (110), e.g., as program viewing history (270) and/or by wireless device (180). Buffering may or may not take place at the receiver (110), according to the availability of short-range wireless connection (190), and/or at the wireless device (180), according to the availability of wireless connection (210). Numerous variations of these strategies are possible. For example program viewing indication information may be sent during or immediately after each program is viewed using short-range wireless interface (190), which may be assumed to have high availability, whereas due to various transmission impairments common to wireless communication channels (for example, cellular "no coverage" zones) it may be necessary to buffer one or more program viewing indications at wireless device (180) before relaying the program viewing indication information to service provider (150) using wireless connection (210).

Referring again to FIG. 6, the user applications (280) may be specific to each user-operated receiver (110), or of a common type that can be used by a multitude of different user-operated receivers. One example of such a user application (280) is a user-interface application that provides a method to present data to the user and to provide user input to the user-operated receiver (110).

The program viewing history (270) and the user applications (280) can also modify the manner in which the user-operated receiver functions. One such method of functional modification is to download new operating system software, software components, APIs, etc. to the user-operated receiver.

Personalized functionality may be provided to receiver (110), for example, by downloading new applications (280) into memory (250) based upon the pre-download set of applications (280) and the program viewing history (270). For example the program viewing history (270) may indicate that the user may benefit from an update to an existing user interface application (280) which update includes better support for interactive features of programs previously viewed and a download request may be initiated to acquire the update from service provider (150) via device (180) using wireless connections (210) and (190).

Figure 9:
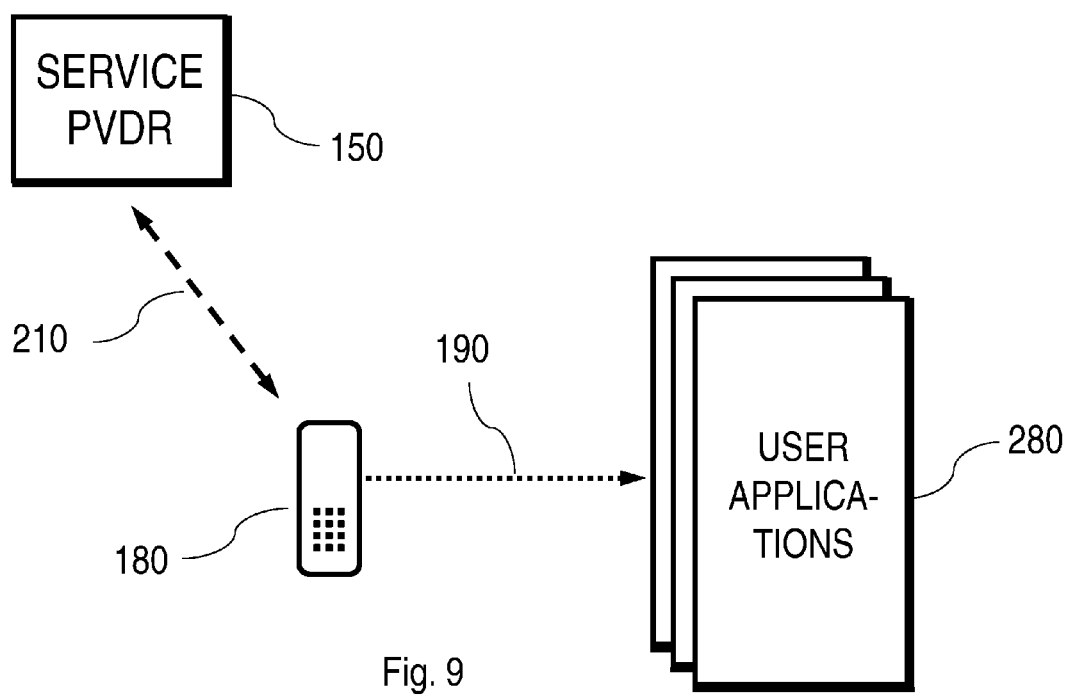
FIG. 9 shows an embodiment of transmitting an application program from a service provider to a user-operated multimedia receiver using a wireless device as a relay.
Figure 10:
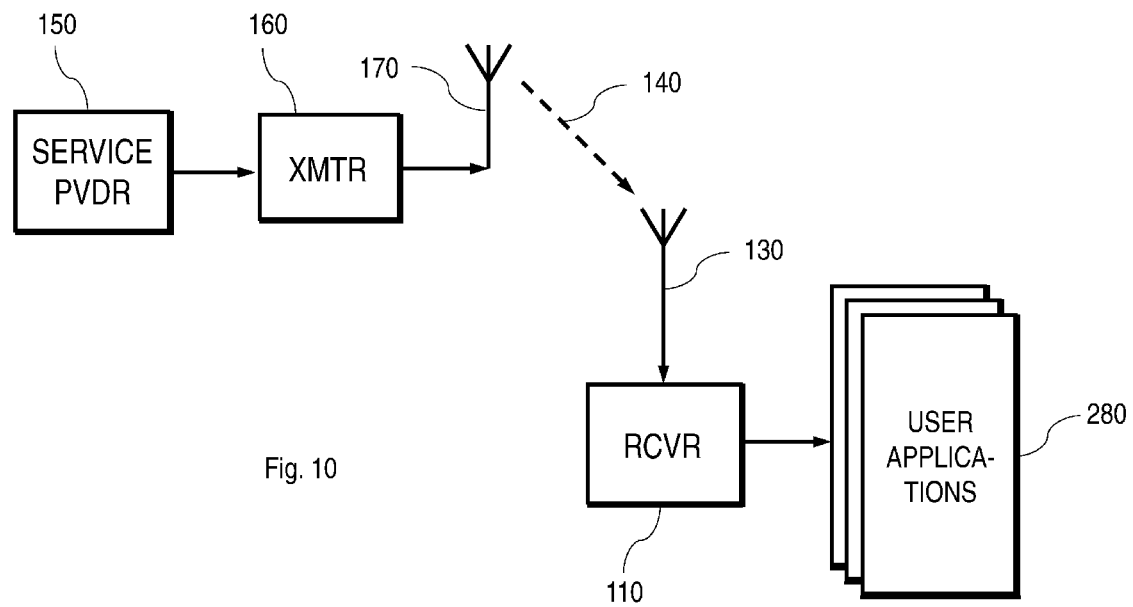
FIG. 10 shows an embodiment of transmitting an application program from a service provider to a user-operated multimedia receiver using an off-air broadcast network.

The user applications (280) may be sent to the user-operated receiver by means of the wireless network, using wireless connections (210) and (190) as shown in FIG. 9, or alternatively, using over the over-the-air transmission (140), as shown in FIG. 10. A combination of the two download mechanisms is also possible. For example one or the other of the connections (210) and (140) may be unavailable at any given time, for example due to cellular "no-coverage" zones, in the case of connection (210), and a download partially completed using one of the two connections (210) and (140) may be completed by using the other of the connections (140) and (210). In another example, one of the connections (210) and (140) may carry a higher monetary charge to the user's account for downloading, and the service provider may choose the lower cost connection to minimize the charge to the user at any given time. Many wireless devices (180), for example cell phones, include means for determining their geographic location, such as GPS devices. Means of determining locations of cell phones using "triangulation" based on comparing signal strengths of cell phone signals received at multiple cell tower sites are also well known. The service provider may interrogate, for example, the receiver (110), and/or the wireless device (180) and/or a cellular network operator (not explicitly shown in the Figures, but a facility that may support connection (210) using wireless transmitter/receiver (155) and well known protocols) to determine the location of receiver (110) and/or wireless device (180). The service provider may then choose to use the lower cost connection of either (140) or (210) for the download, based on, for example, locally applicable charges of the cellular network operator and broadcast transmitter (160) operator.

Figure 11:
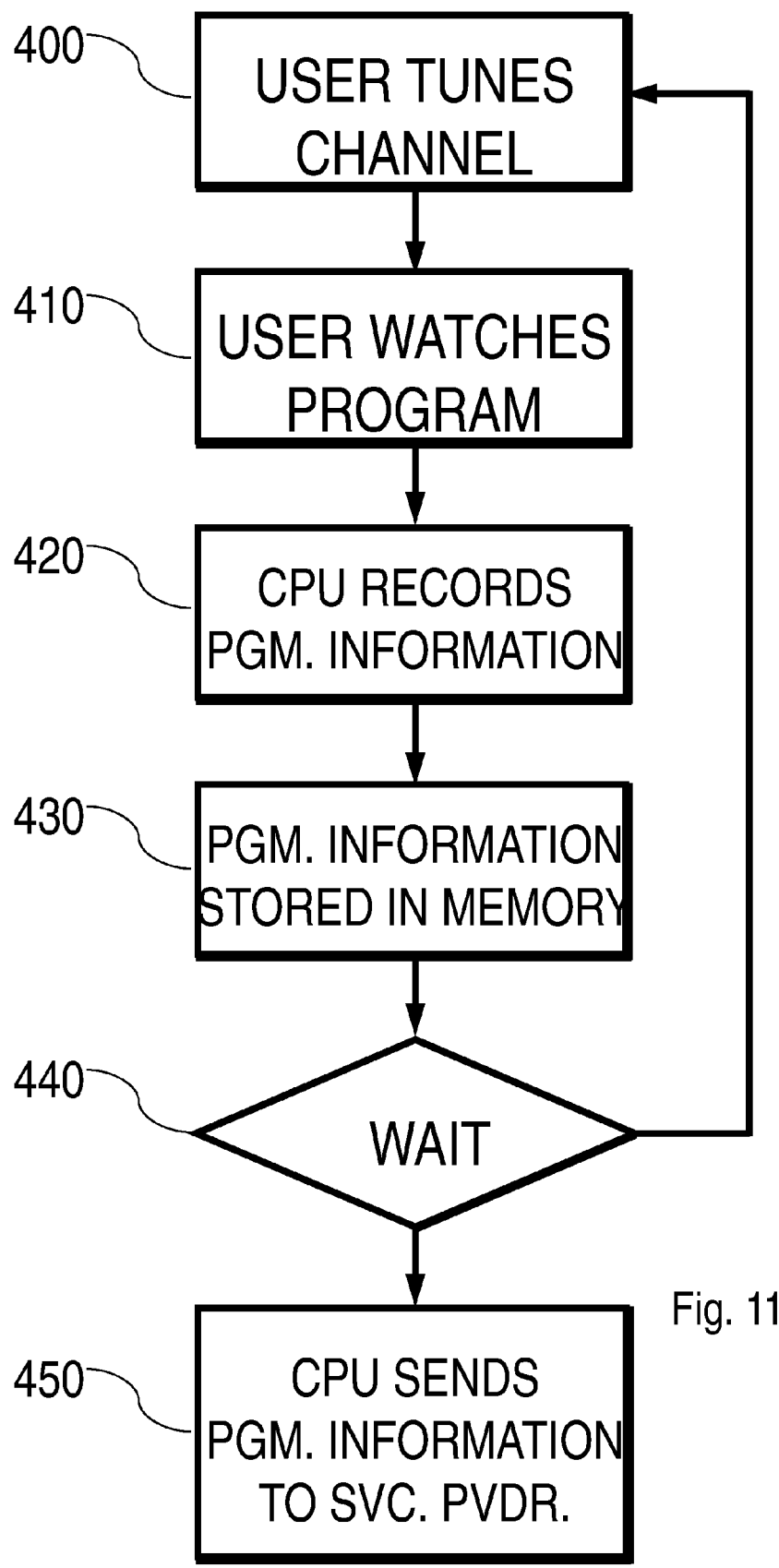
FIG. 11 shows a flow chart of an embodiment of capturing program viewing history and transmitting the viewing history to a service provider.

The software that supports the functionality of this invention can similarly describe the invention, and some or all of the described features may be realized in software or hardware. One such embodiment is shown in FIG. 11. The user tunes (400) a channel, for example using tuner (220) to watch (410) a desired program. The CPU (240) records (420) this activity, wherein such data can include the channel identification, program name, time of program consumption, and/or similar information. This data may then be stored (430) in memory (250), for future retrieval. The receiver (110) may then wait (440) and repeat this process for a predetermined length of time. After the predetermined length of time has expired, the CPU (240) may send (450) a history of the receiver program information (270) to the service provider (150). The predetermined length of time may be adjusted to provide a compromise between the timely relay of the information and a minimization of wireless connection (210) network access for the return path. If wireless connection (210) is a cellular network connection, access charges may vary according to packet size, geographic location of the wireless device (180), and time of day, among other possible factors. For example, CPU 240 may wait (440) until it has accumulated enough program viewing information (270) to populate an integral number of SMS messages before sending (450) the information (270) to the service provider.

Variations of the Invention

The user-operated receiver (110) including display unit (120) may, in some embodiments, also be described as a mobile TV.

The user-operated receiver (110) including display (120) may alternatively be realized by an appropriately equipped portable computer system, such as a laptop PC equipped with both an over-the-air TV tuner and a short-range wireless connection. The over-the-air tuner and short-range wireless radio may be integrated into the PC, or alternatively could be provided as plug-in devices. The user-operated receiver and display may be realized by other appropriately equipped portable systems, such as tablet computers, "netbooks," and other hybrid devices of arbitrary size.

The user-operated receiver (110) including display (120) may be realized by a permanently or removably affixed system in an automobile or other vehicle.

The user-operated receiver (110) including display (120) may be realized by other combinations of separate components, such as a set-top box with an interconnected display.

The display (120) used to render video images maybe any one of a number of different display types, such as those constructed from alternative materials, bendable screens, and projection devices.

The audio-visual decoder, for example video decoder (230), audio decoder (232), display (120), and speaker (122) may be replaced with other types of processing and user entertainment devices, such as an audio-only decoder and sound reproduction apparatus.

The receiver (110) can process digital data that can also include other services that are supplied to the user, such as closed captions (124).

The wireless device (180) used to relay information may comprise, as alternatives to a cell phone, other types of wireless devices, for example, PDA's, Blackberry's, and the like.

The various antennas described herein, for example (130) and (184), may, in some embodiments be replaced with any of various other radio-frequency (RF) transducers, such as printed-circuit antennas.

Figure 12:
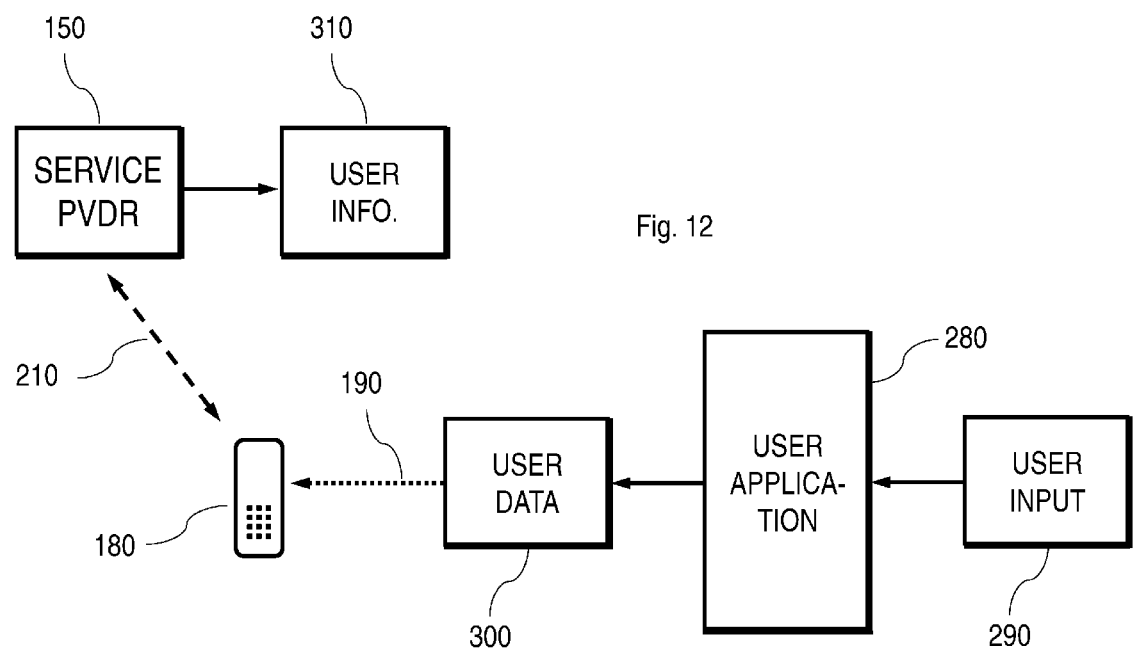
FIG. 12 shows an embodiment of receiving user input by a multimedia receiver and transmitting the user input to a service provider using a wireless device as a relay.

The user may input data directly into the receiver (290), and that data (300), in turn, can be relayed to the service provider, which can maintain and process the user information (310), as shown in FIG. 12. This data entry can be facilitated by means of an on-screen graphical user interface, using, for example, display (120)

In order to protect the privacy of the users, some or all of the directly-input user data (290) may remain resident in the user-operated receiver (110), according to the user's preferences.

The wireless device (180), if implemented as a cellular telephone, may communicate with the service provider by using its data modem function.

The wireless device (180), if implemented as a cellular telephone, may communicate with the service provider by using the data services of the cellular telephone network.

The wireless device, if implemented as a cellular telephone, can communicate with the service provider by using the text messaging services of the cellular telephone network. For example Short Message Service (SMS) can be used.

The service provider may comprise multiple entities that are not co-located. For example, the service provider may comprise one or more non-co-located broadcast entities and/or one or more non-co-located wireless entities.

The program viewing statistics may be aggregated at receiver (110), wireless device (180), or gateway manager (320), to minimize transmission time and/or bandwidth and/or cost. For example, viewing information may be transmitted from receiver (110) to wireless device (180) as each program is viewed. Processing at wireless device (180) may reduce the raw viewing information to a smaller amount of information such as statistics only. As a simple example, if a program is viewed more than once, it may not be necessary to transmit all of the information describing the program to the service provider; only the program title and a count of the number of viewings of that program may be transmitted to the service provider.

A program guide may be transmitted from the service provider to wireless device (180), and the program guide may be accessed by receiver (110) using a simplified user interface. This may minimize storage and/or processing power requirements at receiver (110). For example only a subset of the program guide information may need to be accessed at receiver (110) at any given time.

A program guide transmitted to receiver (110) and/or wireless device (180) may be based on the location of the receiver or wireless device. Receiver (110) or wireless device (180) may transmit its location, for example its GPS coordinates, to the service provider, and the service provider may then transmit a program guide appropriate to the location of receiver (110) or wireless device (180) to receiver (110) or wireless device (180). Alternatively, information describing one or more programs currently or recently received by receiver (110) may be transmitted to the service provider and the service provider may then consult a database to determine other programs that may be receivable based on the programs already received. An appropriate program guide containing these potentially-receivable programs may then be transmitted to receiver (110) and/or wireless device (180) by the service provider.

Wireless device (180) may run a web browser that may be accessed by a simplified user interface from receiver (110). Interactive video programs may use a web page for interaction, and running the web browser on wireless device (180) may save processing power at receiver (110).

Receiver (110) and wireless device (180), or the service provider may provide a swap function that enables the receiver user to interchange the video displayed on receiver (110) and wireless device (180). For example, if the user notifies the service provider that she wants to watch two programs simultaneously, the service provider may transmit the first program to receiver (110) and the second program to wireless device (180), if wireless device (180) also has a video display, e.g., (189). It may be desirable to listen to the audio of only one of the two programs at a time. However, from time to time the user may want to listen to the audio of the "other program". Receiver (110), being intended for audio-visual material, may have a display (120) and/or sound reproduction system (122) that is superior to that of wireless device (122). The service provider, or receiver (110) and wireless device (180) operating collaboratively, may offer the receiver user the capability to swap the first and second programs back and forth between the displays, for example (120) and (189) of receiver (110) and wireless device (180), respectively.

Receiver (110) may notify the service provider of intermittent loss of reception of a program. The service provider may provide that program to wireless device (180), and/or to receiver (110), using short range connection (190), during the periods of reception loss. Alternatively, the service provider may provide a summary of the program during periods of reception loss. The summary may comprise video clips and/or audio, and/or text. A delay may be interposed in the broadcast video to accommodate delay in generating the summary.

Wireless device (180) may provide an audio-visual programming storage and replay function for receiver (110). Programming data may be transmitted to and received from wireless device (180) using short range wireless connection (190). Wireless device (180) may include a large hard drive or flash memory to store the program data. This may save processing power, battery life, storage space and device cost of receiver (110).

The embodiments of the present invention may be implemented with any combination of hardware and software. If implemented as a computer-implemented apparatus, the present invention is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

The invention claimed is:

1. A method of providing interactive services to a mobile device, comprising:

transmitting programming on-air to a first mobile device by a first facility in communication with a service provider;

receiving by a second facility in communication with the service provider first information based on the programming, wherein the first information comprises information relayed from the first device to the second facility after being processed by a second mobile device;

transmitting by the second facility second information to the second device, wherein the second information comprises information to be processed by the second device and relayed from the second device to the first device; and transmitting third information comprising at least one update to software of the first device by a facility selected from the group comprising the first facility and the second facility, wherein the at least one update is based on a pre-update software complement and pre-update usage information of the first device.

2. The method of claim 1, wherein the receiving is initiated when communication cost is favorable.

3. The method of claim 1, wherein the receiving is responsive to a request transmitted by a facility selected from the group comprising the first facility and the second facility.

4. The method of claim 1, further comprising aggregating programming viewing statistics by a processing node selected from the group comprising the first device, the second device, the second facility, a gateway manager and the service provider.

5. The method of claim 1, wherein the first information comprises programming usage information compiled automatically by the first device.

6. The method of claim 1, wherein the first information is selected from the group comprising interactive response information, program usage information, the first device user's viewing preferences, the first device user's device operational preferences, and the first device user's demographic information.

7. The method of claim 6, wherein the usage information comprises at least a portion of the usage information that was stored by the second device at an earlier time.

8. The method of claim 6, wherein the usage information is generated from information that documents viewing of the programming.

9. The method of claim 1, further comprising receiving from the second device the usage information and software complement information prior to transmitting the update.

* * * * *